Fig:1

INVENTORS
GEORGES NADAY AND ALFRED PERATO

INVENTORS
GEORGES NADAY AND ALFRED PERATO

UNITED STATES PATENT OFFICE 2,632,161

FREQUENCY MODULATED RADAR SYSTEM

Georges Naday and Alfred Perato, Paris, France, assignors to Compagnie Generale de Telegraphie Sans Fil, a corporation of France Application February 28, 1950, Serial No. 146,806
In France March 12, 1949

3 Claims. (Cl. 343—14)

Our invention relates to the radio-detection of stationary and moving objects, using the phenomenon of the echo, and in particular to the measurement of the distance of said objects. It relates more particularly to the so-called frequency-modulation detection which is characterised by the fact that the transmitter, which operates in a continuous manner, is subjected to a gradual modulation of frequency with a predetermined recurrence, which modulation may in particular be of linear form. The wave of frequency $F_o$, after having been reflected by the nearest obstacle 1, returns to the transmitter at the instant $t_1$ which is fixed by the distance of said obstacle. At this instant, the frequency of the transmitter passes through the value $F_1$. By superimposing the reflected wave on the transmitted wave, beats are obtained, the frequency $(F_1-F_o)$ of which characterises the distance of the obstacle. The same wave $F_o$ later reaches the more distant object $n$ and its echo returns to the transmitter at the instant $t_n$ at which the transmission frequency passes through the value $F_n$. The characteristic beat will in this case be $F_n-F_o$. All the obstacles will thus be defined by a particular characteristic frequency that enables their distance to be represented.

In order to convert these beats into a visual selective indication of the distance, it has already been proposed to use a comparatively large number of resonant circuits in parallel, each of which is tuned to a particular beat frequency and is connected to an independent frequency-measuring instrument such as a frequency meter. This solution, which is not dependent on time, is relatively too complicated and is not sufficiently accurate.

It has also already been proposed, in order to simplify the system, to use the deflection of a cathode ray and a single resonant circuit to which the beats between the transmitted signal and the echo were applied. The natural frequency of said circuit was made to vary in synchronism with the frequency-modulation of the transmitter so as to cause its tuning to pass successively through all the beat frequencies, starting with the frequency $F_1-F_o$ of the nearest obstacle. At the same time and in synchronism with this tuning, the cathode ray of a single receiving oscillograph was deflected along a transverse time base corresponding to the scale of distances. The characteristic beats were thus successively transmitted to the tube and, by modulating its beam, produced luminous marks for reading the distances.

Our invention has for its object another method for the selective collection of the characteristic beat frequencies, which, while enabling the distances to be read by means of a single oscillograph, has the advantage of being comparatively simple and of providing a very high degree of accuracy, owing to the fact that the means for carrying it out are rugged and are suitable for an accurate synchronization.

According to the invention, instead of varying the tuning of the resonant circuit pertaining to the receiver, a suitably chosen fixed tuning filter-circuit is used at that point, the signal transmitted at modulated frequency is collected and is frequency-modulated locally before being made to beat with the echo. This additional modulation is effected in a gradual and recurrent manner in synchronism with the normal modulation of the transmitter and according to a law such that the beats between the thus modulated transmitted signal and the echo successively pass, in relation to time, through the frequency of the fixed tuning filter-circuit. Simultaneously, and in synchronism with the additional selection modulation, a deflection is imparted to the cathode ray which is modulated at the given instant by that echo, the thus modulated local frequency of which produces a beat frequency equal to the frequency of the filter.

According to a modified embodiment of this method, use is made, for producing said selective frequency-modulation, of a variable frequency local oscillator which is accurately synchronized with the transmitter and is preferably controlled by the same shaft as that which varies the frequency of the transmitter. This same shaft is preferably used for synchronizing the time base of the oscillograph.

According to another embodiment, in order to increase the stability and the accuracy, an additional oscillator stabilized by quartz is inserted; the signal supplied by this latter oscillator, after mixing with the output of the selective modulation oscillator, passes through a frequency-multiplier and is then fed to a mixing circuit which receives on the other hand the signal of the transmitter. This circuit is connected to another mixing circuit which receives the echo and to which is connected the fixed-frequency filter followed by a normal superheterodyne receiver.

Our invention will be more clearly understood by means of the accompanying drawings which are given by way of a non-limitative example and in which.

Figure 1:
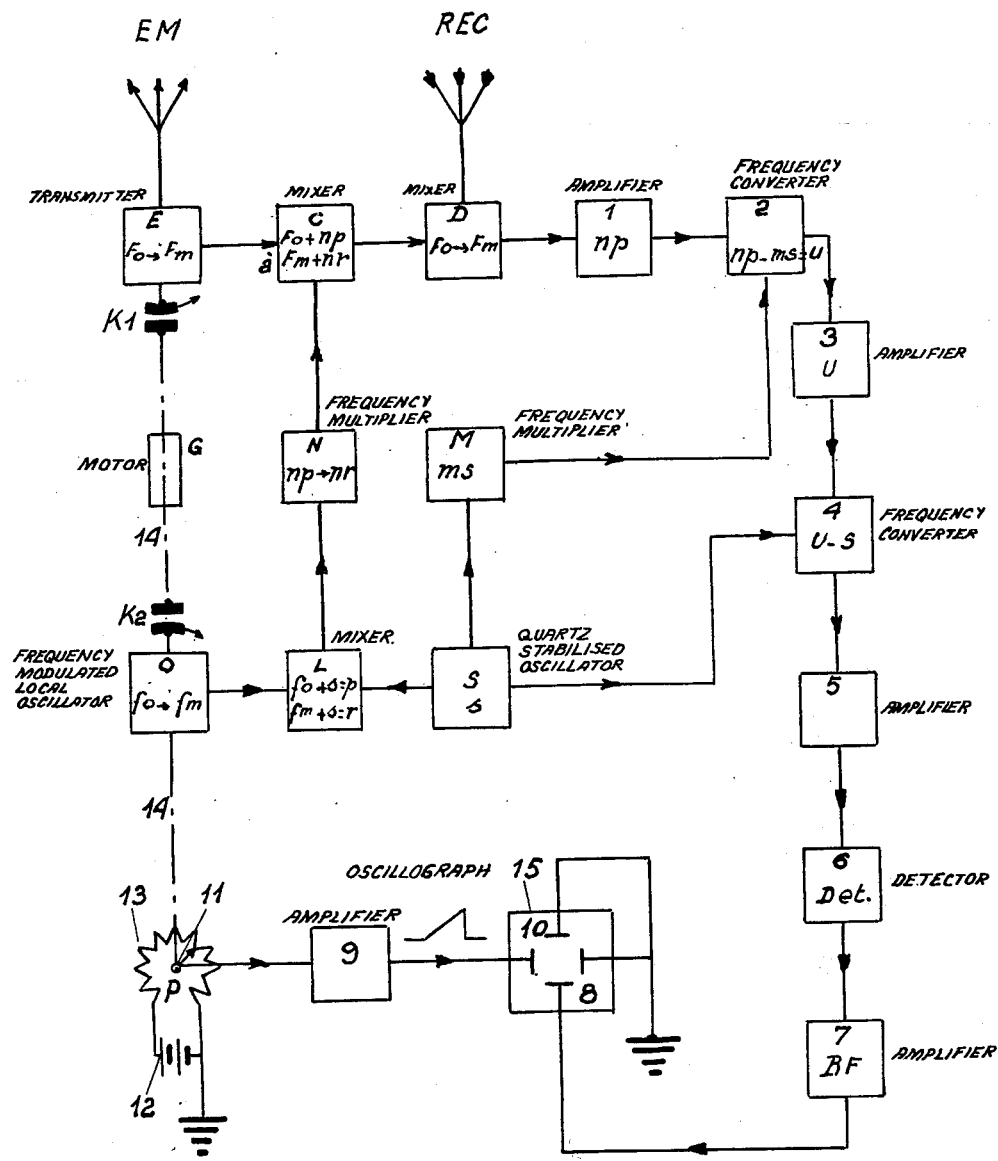
Fig. 1 shows a diagram of a complete system for measuring distances constructed according to the invention said system comprising the selective modulation circuit, the beat producing circuit and the receiving circuit, and also the circuit for producing a time base of a synchronized cathode ray oscillograph.

In Fig. 1, the squares surround the various portions of the complete system, the mutual connection and the functions of which will be explained in detail in the part of the description that relates to the operation of the system. E denotes the transmitter, the frequency varying device of which is symbolically represented by a variable condenser $K_1$. The local oscillator that produces the selective modulation is designated by O. Its frequency is tuned by the condenser $K_2$. Both these members are actuated by the common shaft 14 driven by the motor G. The same shaft actuates the potentiometer P that produces the saw-tooth signal of the time base of the receiving oscillograph 15. The echoes of the objects detected are received by the mixer D which is connected, on the one hand to the superheterodyne receiving set 1—2— ... —7, and on the other hand to the mixing stage C which is connected on the one hand to the transmitter E and on the other hand to a frequency-multiplier N. The frequency-multiplier N is connected to a mixer L, to which are connected the variable frequency oscillator O, and the oscillator S, the frequency of which is stabilized by quartz. This latter oscillator also supplies the local frequency changing oscillations to the receiver and, for this purpose, is connected, by means of a frequency-multiplier M, to the stage 2 of the first frequency change, and directly to the stage 4 of the second frequency change.

Figure 2:
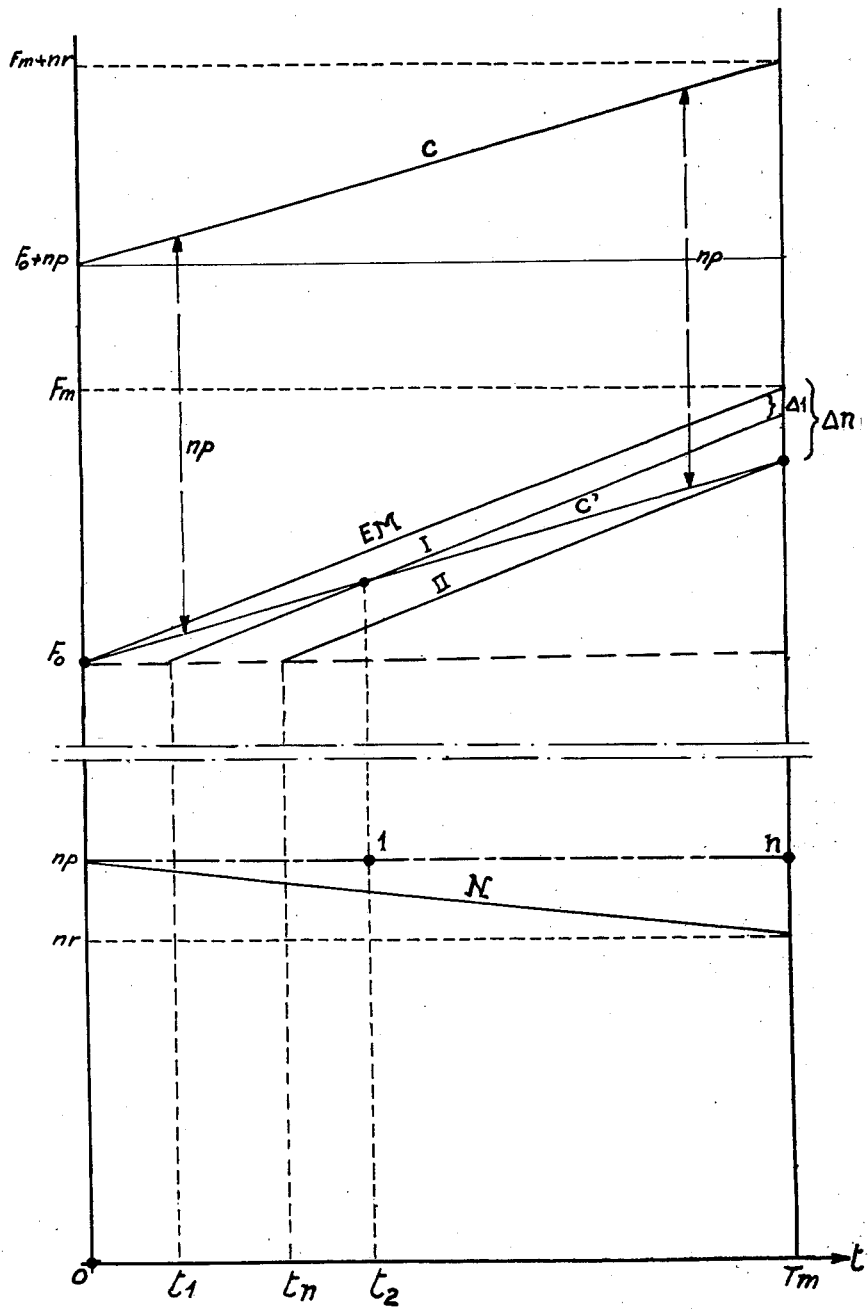
Fig. 2 shows the electric diagram thereof which explains its operation.

The system operates as follows:

The transmitter of initial frequency $F_o$ is frequency-modulated, according to a suitable law, from $F_o$ to $F_m$. This modulation is effected during the interval of time $T_m$. In Fig. 2, for the sake of greater convenience, a law of linear variation represented by the straight line EM has been adopted.

An objective is adapted to reflect energy and said said energy will return to the transmitter after a time $$t = \frac{2d}{c}$$

($d$=distance at which the objective is located, $c$=velocity of light). The frequency of the energy thus reflected is constantly variable between $F_o$ and $F_m$, but there exists a difference in time which results in a difference in frequency between the echo and the transmitter signal, said difference in frequency being constant for each of the objectives and characterising them in a selective manner.

This difference in frequency, for an objective at the distance $$d_1 \left( \text{with } t_1 = \frac{2d_1}{c} \right)$$

is $$\Delta_1 = \frac{F_m - F_o}{T_m} \times t_1$$

Assuming that the maximum range required of the system is $$d_n \left( d_n = t_n \times \frac{c}{2} \right)$$

the maximum difference will be $$\Delta_n = \frac{F_m - F_o}{T_m} \times t_m$$

The frequencies of the echo received are represented by the straight lines I and II, the respective distances of which from the straight line EM are the characteristic quantities $\Delta_1$ and $\Delta_n$.

In synchronism with the modulation of the transmitter, the oscillator O supplies a frequency which is variable from $f_o$ to $f_m$, $f_m$ being smaller than $f_o$. The law according to which this oscillator is frequency-modulated is chosen in a suitable manner; in the present case, it is linear.

The signal supplied by the oscillator O is combined with the signal supplied by a quartz oscillator S at the stabilized frequency $s$; a combined signal is thus obtained, the frequency of which extends from the frequency $f_o + s = p$ to the frequency $f_m + s = r$.

This signal passes through a frequency-multiplying stage N, and a frequency is thus obtained which extends from $np$ (at the instant 0) to $nr$ (at the instant $T_m$) and which is represented by the straight line N. For the best possible use of the system, it is advisable to make $np - nr = \Delta_n$ The signal that issues from the multiplier is then combined with a signal supplied by the transmitter. A frequency-modulated signal is thus obtained, the frequency of which changes from $F_o + np$ at the instant 0 to the frequency $F_m + nr$ at the instant $T_m$. This signal is represented by the straight line C. This latter signal is used to produce the beats with the reflected signals, in the mixer D.

By way of example, it may be assumed that $F_o = 1,300$ megacycles, $F_m = 1,330$ megacycles, $T_m = 20,000$ microseconds (recurrence frequency 50 periods per second).

If the range required is 30 kilometres (200 $\mu$'s), then $\Delta_n = 300$ kilocycles.

It will be assumed that $s = 10$ megacycles and $n = 3$ and $f_o$ will be chosen $= 3.5$ megacycles, $f_m = 3.4$ megacycles, which gives $np = 40.5$ megacycles and $nr = 40.2$ megacycles.

The input circuit 1 of the receiver should be tuned to the fixed frequency $np$, so that there will only be a utilizable beat when the difference in frequency between the energy reflected by an objective (curves I—II) and the energy obtained by the above indicated mixing (curve C) is at the frequency $np$.

As can be seen in the figure, this will be produced once and once only by a characteristic echo: at the instance 0 for an objective at the distance 0, at the instant $t_2$ for an objective at the distance $d_1$ and at the instant $T_m$ for an objective at the distance $d_n$. These instants are accurately determined by the points of intersection of the modulation line C' with the lines I and II. This straight line is obtained by shifting the selective modulation line C parallel to itself the distance $np$. The selected echoes of the detected objects will be distributed along the time base of the "echoes," between the points $l$ and $n$.

After amplification at the frequency $np$, the signals are fed through a mixer 2 and converted to the frequency $u$ by beating with a signal of frequency $ms$ supplied by the frequency-multiplying stage M connected to the quartz oscillator S.

A further amplification at 3 at the frequency $u$ is followed by a frequency change at 4 by interference with the signals at the frequency $s$ supplied by the quartz oscillator S. The stage 4 feeds the frequency $u-s$ into the amplifier 5 which is tuned to that frequency, followed by a detection at 6 and finally a low-frequency amplification at 7.

The signals are then fed to the indicator. This indicator may be constructed in the shape of an oscilloscope with horizontal linear deflection, only the deflecting system of which is shown. The impulses are in this case applied to the vertical plate 8.

The deflection is produced by applying to the horizontal plate 10 a saw-tooth voltage obtained for example from a potentiometer P, the arm 11 of which is driven by the shaft of the motor G and slides on the resistance 13 which is supplied by the battery 12. Said saw-tooth voltage is amplified to the necessary level in 9.

Fig. 2 clearly shows one of the advantages of the invention which enables the time scale to be amplified considerably. Whereas with an impulse radar system, the echo of an object 30 km. away occurs 200 microseconds after the transmission, with this system the echo occurs 20,000 microseconds after the initial instant.

On the other hand, the accuracy of measurement of the distance is excellent; it depends only on the band width of the last stage of intermediate-frequency amplification.

In the example considered, the frequency of this last stage is 500 kilocycles. With a quartz filter, it is possible to obtain without difficulty a band width of 500 cycles (Q-factor equal to 1,000). A discrimination equal to $$\frac{1}{1000}$$

of the scale will therefore be obtained, i. e. an accuracy of 30 metres in the measurement of the distance.

The use of a single shaft for actuating all the variable members of the system enables an absolute synchronism to be maintained and the accuracy of measurement to be still further increased.

What we claim is:

1. A radio electrical system for determining the distance of an object, comprising in combination, a transmitter and an auxiliary oscillator, both said transmitter and said auxiliary oscillator generating frequency-modulated radio oscillations which are modulated cyclically as to frequency at the same rate and in synchronism with each other, the cycle of frequency modulation of said transmitter having an increasing frequency, the cycle of modulation of said auxiliary oscillator having a decreasing frequency, the frequency of said transmitter at the beginning of a cycle being much higher than the frequency of said auxiliary oscillator at the same moment; directive antenna means connected to said transmitter for radiating the modulated waves generated by said transmitter toward the object; receiving means for receiving the waves after reflection by the object; a first mixer connected to the outputs of said transmitter and said auxiliary oscillator for mixing the modulated oscillations of said transmitter with the oscillations of said auxiliary oscillator so as to generate first beat oscillations; a second mixer connected to the output of said first mixer and to said receiving means for mixing the first beat oscillations generated by said first mixer with the oscillations received by said receiving means so as to produce second beat oscillations; a selective receiving means connected to the output of said second mixer and arranged so as to detect among the second beat oscillations those having a frequency substantially equal to the frequency of said auxiliary oscillator at the beginning of the cycle; indicating means for registering the instant at which said receiver detects a beat note having the frequency of said auxiliary oscillator at the beginning of the cycle; and means for measuring the time separating the last mentioned instant from the beginning of a modulation cycle, this time period being essentially a function of the distance of the object.

2. System as claimed in claim 1, said auxiliary oscillator including a quartz-stabilized source of oscillations having a constant frequency, a nonstabilized source of frequency modulated oscillations, a mixer connected to said sources and mixing the oscillations generated by said sources, so as to obtain beat oscillations and a frequency multiplier connected to said mixer, said frequency multiplier multiplying the frequencies of the beat oscillations thus obtained.

3. A system as claimed in claim 1, wherein said indicating means and said time-measuring means include an oscillograph comprising a cathode ray tube; means arranged in said tube for producing a deflection of the cathode rays in one direction at the moment when said receiver detects a beat note having the frequency of said auxiliary oscillator at the beginning of the cycle; and means arranged in said tube for deflecting the cathode rays in a different direction by a sawtooth potential being in synchronism with the cycle of modulation of said transmitter and said auxiliary oscillator.

GEORGES NADAY.
ALFRED PERATO.

REFERENCES CITED

The following references are of record in the file of this patent:

UNITED STATES PATENTS

| Number | Name | Date |
|---|---|---|
| 2,433,804 | Wolff | Dec. 30, 1947 |
| 2,485,583 | Ginzton | Oct. 25, 1949 |
| 2,528,109 | Blitz | Oct. 31, 1950 |